Patented Apr. 26, 1927.

1,626,493

UNITED STATES PATENT OFFICE.

WILLIAM F. ZIMMERLI, OF AKRON, OHIO, AND CARLISLE H. BIBB, OF NEW BRUNSWICK, NEW JERSEY, ASSIGNORS TO JOHNSON & JOHNSON, OF NEW BRUNSWICK, NEW JERSEY, A CORPORATION OF NEW JERSEY.

ADHESIVE.

No Drawing. Application filed November 6, 1924. Serial No. 748,194.

The objects of this invention are to obtain from an emulsion of rubber and water an adhesive which can be packaged and sold at retail, to utilize latex for such an emulsion, and more especially commercial latex; to thus secure a liquid adhesive which when used to unite two yielding bodies is elastic so that it will yield with said bodies without fracturing or impairing the joint; to secure an adhesive which shall be water-proof so that it will remain unchanged if moistened or wet; to obtain such an adhesive by which gauze, absorbent cotton or other material can be firmly secured to the skin by surgeons, nurses and others; to thus enable bandages, dressings and the like to be neatly, quickly and conveniently secured in place, and to obtain other advantages and results as may be brought out by the following description.

Our improved adhesive preferably consists of commercial rubber latex, sterilized in an appropriate manner, as for example, by heating to 100° C. for an hour for each of three consecutive days, and stabilized. It will be understood that latex, as it is now purchased on the market, contains about 2% of ammonia, and approximately 35% rubber, the rest being water and impurities, and the ammonia is employed to prevent coagulation. Latex, as thus constituted, is obtained by adding the ammonia to the natural product of the rubber tree in a more or less concentrated form, but it would be within the scope of our invention to utilize an emulsion of rubber and water obtained in any other way. Any suitable emulsion of rubber and water, however produced, can be used for our purpose, and its degree of rubber concentration may be lower or higher than that stated above. The amount of ammonia may be varied, as desired, in order to best prevent coagulation, and may vary with the different degrees of concentration: furthermore, the emulsion of rubber and water can be preserved from coagulation by any other suitable chemical which is not injurious to the adhesive. Therefore, we do not limit ourselves to ammonia as the stabilizing or emulsifying agent and may with equal facility use, for example, sodium silicate or sodium phosphate.

For use as a surgical adhesive, the latex must be sterilized, and this may be accomplished by subjecting the material to appropriate heat, water and ammonia being added as necessary to maintain the proper degree of concentration and prevent coagulation. Commercial latex may contain pathogenic or other germs or bacteria, rendering it unfit for use as a surgical adhesive, and sterilization, therefore, is a highly important step. Medicinal materials may be added to the surgical adhesive for their beneficial effect upon the skin or compounding materials may be added for their effect on the adhesive when dry, without affecting our invention.

In using our improved adhesive for securing dressings to the skin, a little of the liquid is applied to the skin around the wound, using a small brush, cotton swab, paddle or the like. This is allowed to partly dry, for a few moments, and then the gauze pad or bandage should be placed evenly over the wound with a slight pressure so that the edges of the folded gauze or bandage are in contact with the adhesive. When completely dry the gauze or bandage is firmly held in place. If necessary a little of the liquid can be applied over the edges of the pad to still more securely attach the dressing. The edges of the dressing alone require fixing to the skin in order that there shall be no interference with the drainage through the dressing.

A bandage or dressing applied in this way is firmly and securely held to the skin by an elastic adhesive so that the moving or flexing of the skin in a natural way will not displace the bandage or dressing. The permanent elasticity of this adhesive makes a dressing more secure than when collodion or adhesive tape is used. It allows the replacing of a large and uncomfortable bandage with a small pad making such a dressing more comfortable and cooler. The adhesive being insoluble in water is an added advantage. After the dressing is removed, the adhesive remaining on the skin can easily be removed by gentle rubbing with the fingers.

Having thus described the invention, what we claim is:

1. A surgical dressing adhesive, consisting of a sterilized rubber latex emulsion containing a stabilizing agent.

2. A surgical dressing adhesive, consisting of a sterilized rubber latex emulsion stabilized by ammonia.

3. A surgical dressing adhesive, consisting of a heat sterilized rubber latex emulsion stabilized by ammonia.

WILLIAM F. ZIMMERLI.
CARLISLE H. BIBB.